(12) United States Patent
Kameo et al.

(10) Patent No.: US 12,555,267 B2
(45) Date of Patent: Feb. 17, 2026

(54) TARGET DETECTION DEVICE, TARGET DETECTION METHOD, AND TARGET DETECTION PROGRAM

(71) Applicant: MITSUBISHI HEAVY INDUSTRIES, LTD., Tokyo (JP)

(72) Inventors: Naruhisa Kameo, Tokyo (JP); Kiichi Sugimoto, Tokyo (JP); Kenta Nakao, Tokyo (JP); Tomohiro Matsumoto, Tokyo (JP); Satoshi Iio, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 286 days.

(21) Appl. No.: 18/128,093

(22) Filed: Mar. 29, 2023

(65) Prior Publication Data

US 2023/0316570 A1    Oct. 5, 2023

(30) Foreign Application Priority Data

Mar. 31, 2022   (JP) ................................. 2022-058515

(51) Int. Cl.
    *G06K 9/62*    (2022.01)
    *G06T 7/73*    (2017.01)
(52) U.S. Cl.
    CPC ...... *G06T 7/75* (2017.01); *G06T 2207/20081* (2013.01); *G06T 2207/20084* (2013.01)
(58) Field of Classification Search
    CPC ............. G06T 7/75; G06T 2207/20081; G06T 2207/20084; G06T 7/73
    See application file for complete search history.

(56) References Cited

U.S. PATENT DOCUMENTS

| | | | |
|---|---|---|---|
| 2019/0294934 A1 | 9/2019 | Shestak et al. | |
| 2020/0311966 A1 | 10/2020 | Nakata et al. | |
| 2021/0326612 A1 | 10/2021 | Zhou et al. | |
| 2023/0078218 A1* | 3/2023 | Wang | G06N 3/098 |
| | | | 706/12 |
| 2023/0142455 A1 | 5/2023 | Nakao et al. | |

FOREIGN PATENT DOCUMENTS

| | | | | |
|---|---|---|---|---|
| CN | 108765258 A | * | 11/2018 | ............... G06T 1/20 |
| CN | 111612827 A | * | 9/2020 | ............. G06F 18/24 |
| CN | 113344912 A | * | 9/2021 | ........... G06F 18/214 |
| JP | 2018-67149 A | | 4/2018 | |
| JP | 2019-200769 A | | 11/2019 | |
| JP | 2021-163126 A | | 10/2021 | |

* cited by examiner

*Primary Examiner* — Xin Jia
(74) *Attorney, Agent, or Firm* — BIRCH, STEWART, KOLASCH & BIRCH, LLP

(57) ABSTRACT

A target detection device including: a storage unit configured to store a plurality of pre-trained models using a deep learning network model for detecting a target from an image; a camera unit configured to acquire an image; and a target detection processing unit configured to execute parallel processing on the acquired image using the plurality of pre-trained models and detect a target based on detection results of the pre-trained models, wherein each of the pre-trained models differs from the rest of the pre-trained models in a size of a target to be extracted.

8 Claims, 10 Drawing Sheets

TARGET DETECTION DEVICE, TARGET DETECTION METHOD, AND TARGET DETECTION PROGRAM

CROSS-REFERENCE TO RELATED APPLICATIONS

This application claims the benefit of priority to Japanese Patent Application Number 2022-058515 filed on Mar. 31, 2022. The entire contents of the above-identified application are hereby incorporated by reference.

TECHNICAL FIELD

The disclosure relates to a target detection device, a target detection method, and a target detection program.

RELATED ART

As a system for detecting an object from an acquired image, there is a system for detecting an object by using a pre-trained model in which deep learning is performed on a large number of images. JP 2019-200769 A describes a learning device that acquires a first calculated captured image including an imaging object and an environment surrounding the imaging object from a memory, the first calculated captured image including a plurality of first pixels, acquires a captured image including the imaging object and the environment surrounding the imaging object from the memory, the captured image including a plurality of second pixels, acquires an identification result of the imaging object and the environment surrounding the imaging object included in the captured image, generates an identification model configured to identify the first calculated captured image based on the identification result of the captured image with reference to a correspondence relation between the plurality of first pixels and the plurality of second pixels, and outputs the identification model to an image identification device configured to identify a second calculated captured image.

SUMMARY

In a model used for deep learning, a computation amount increases as the number of layers of an analysis model or the number of bits for computation increases. However, the model cannot be applied to a device that is actually used if an available computation amount is limited due to a restriction of the device or the like. In addition, if the number of layers of the analysis model or the number of bits for the computation is simply reduced, a target may not be appropriately detected. In consideration of the above, it is desired to improve the detection accuracy of a target while suppressing an increase in a processing amount.

An object of at least one embodiment of the disclosure is to provide a target detection device, a target detection method, and a target detection program that can detect a target with high accuracy while reducing the processing amount.

In addition, the disclosure provides a target detection device including: a storage unit configured to store a plurality of pre-trained models using a deep learning network model for detecting a target from an image; a camera unit configured to acquire an image; and a target detection processing unit configured to execute parallel processing on the acquired image using the plurality of pre-trained models and detect a target based on detection results of the pre-trained models. Each of the pre-trained models differs from the rest of the pre-trained models in a size of a target to be extracted.

In addition, the disclosure provides a target detection method including: storing a plurality of pre-trained models using a deep learning network model for detecting a target from an image; acquiring an image; and detecting a target, the detecting including executing parallel processing on the acquired image using the plurality of pre-trained models and detecting a target based on detection results of the pre-trained models. Each of the pre-trained models differs from the rest of the pre-trained models in a size of a target to be extracted.

In addition, the disclosure provides a target detection program configured to cause processing to be executed, the processing including: storing a plurality of pre-trained models using a deep learning network model for detecting a target from an image; acquiring an image; and detecting a target, the detecting including executing parallel processing on the acquired image using the plurality of pre-trained models and detecting a target based on detection results of the pre-trained models. Each of the pre-trained models differs from the rest of the pre-trained models in a size of a target to be extracted.

With the above-described configuration, it is possible to appropriately detect a target with high accuracy while reducing the processing amount.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments according to the disclosure will be described in detail with reference to the drawings. Note that, the disclosure is not limited to the embodiments. In addition, components in the following embodiments include components that can be easily replaced by those skilled in the art or components that are substantially the same. Furthermore, the components described below can be appropriately combined, and when there are a plurality of embodiments, the embodiments can be combined.

Target Detection Device

Figure 1:
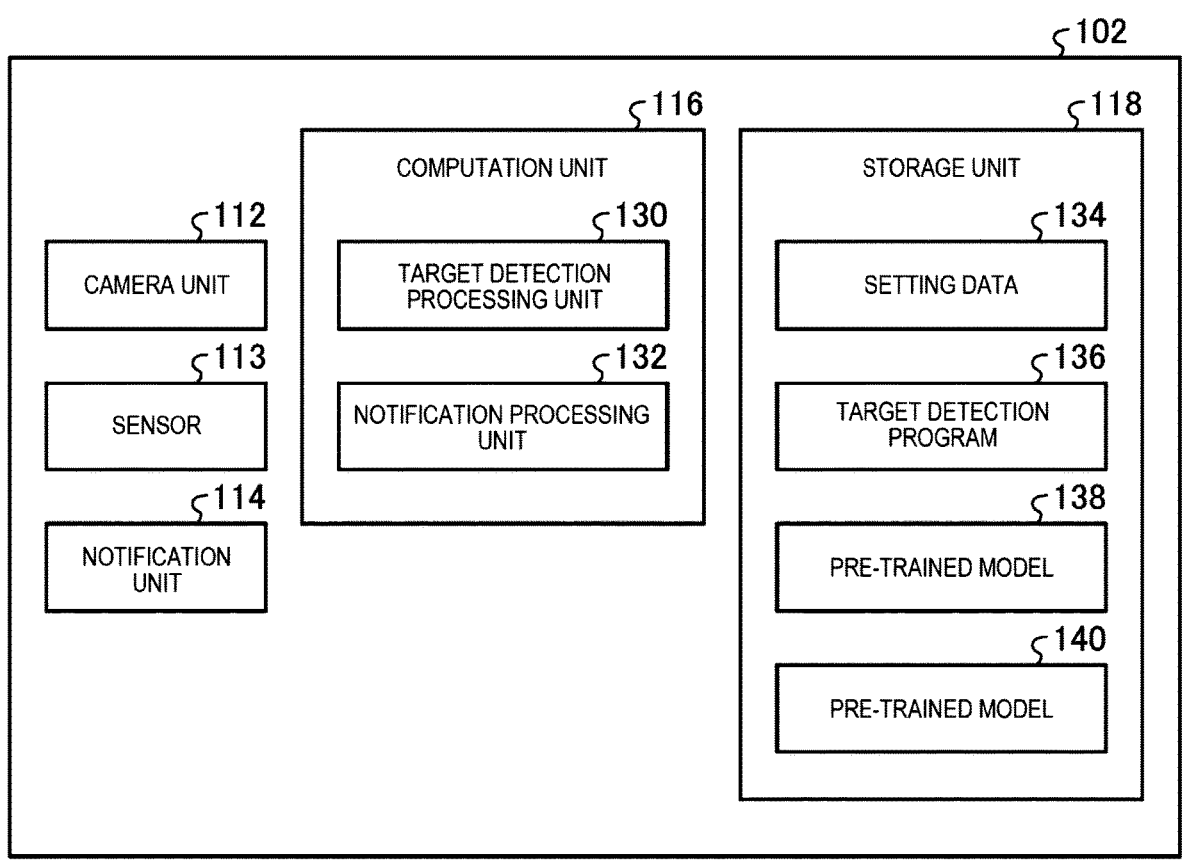
FIG. 1 is a block diagram illustrating an example of a target detection device.

FIG. 1 is a block diagram illustrating an example of a target detection device. A target detection device 102 detects a target by using a pre-trained model that can execute a target detection process of detecting a target from an image using deep learning. The target detection device 102 is installed at, for example, a mobile body such as a vehicle or a flying object, or a building. The target is not particularly limited and can be various categories of targets such as humans, machines, dogs, cats, vehicles, and plants. The target detection device 102 may output a detection result to a control device that controls a mechanism at which the target detection device 102 is installed. Thus, for example, in the case of a mobile body, when a target is detected, a process of stopping the mobile body, a process of avoiding the target, or the like can be executed.

The target detection device 102 includes a camera unit 112, a sensor 113, a notification unit 115, a computation unit 116, and a storage unit 118. The camera unit 112 acquires an image of a target field of view. The camera unit 112 may successively acquire images at a predetermined frame rate or may acquire images triggered by a predetermined operation. The sensor 113 acquires information on surroundings including a region captured by the camera unit 112. An infrared sensor or LIDAR can be used as the sensor 113.

The notification unit 114 gives notification to an operator. The notification unit 114 includes a speaker, a light emitting device, a display, or the like. When the computation unit 116 executes processing and detects a target included in an image, the notification unit 114 notifies the operator that there is the target. When the target is a person, the person who is the detection target may be notified.

The computation unit 116 includes an integrated circuit (processor) such as a central processing unit (CPU) or a graphics processing unit (GPU), and a memory serving as a work area, and executes various types of processing by executing various types of programs using these hardware resources. Specifically, the computation unit 116 executes various types of processing by reading programs stored in the storage unit 118, loading the programs into the memory, and causing the processor to execute instructions included in the programs loaded into the memory. The computation unit 116 executes a process of detecting a target from an image by executing the programs stored in the storage unit 118. The computation unit 116 includes a target detection processing unit 130 and a notification processing unit 132. Each unit will be described after the description of the storage unit 118.

The storage unit 118 includes a non-volatile storage device such as a magnetic storage device and a semiconductor storage device, and stores various types of programs and data. The storage unit 118 stores setting data 134, a target detection program 136, and pre-trained models 138 and 140. Two pre-trained models are illustrated in FIG. 1, but the number of pre-trained models provided is the same as the number of processes executed in parallel by the target detection program 136.

The data stored in the storage unit 118 includes the setting data 134. The setting data 134 includes information such as various types of conditions for executing the target detection program and conditions for executing the pre-trained models.

The programs stored in the storage unit 118 include the target detection program 136, and the pre-trained models 138 and 140. The target detection program 136 is a program that executes a target detection process using the pre-trained models 138 and 140. In the target detection program 136, an image acquisition process, a target detection process, and a determination result output process are also set. An image data processing process may be set in the target detection program 136. The target detection program 136 can calculate a feature (score) serving as a learned determination criterion by causing the computation unit performing image processing to execute the pre-trained models 138 and 140, and executes the target detection process based on the feature.

The pre-trained models 138 and 140 are programs created by learning a deep learning model obtained by inputting image data and outputting presence or absence and a position of a target. As a deep learning model, it is possible to use a deep learning model such as Regions with Convolutional Neural Networks (R-CNN), You Only Look Once (YOLO), or Single Shot multibox Detector (SSD), in which a bounding box called an anchor is set for an image and a feature in the anchor based on the setting is processed to detect whether a target is included in the image.

In the storage unit 118, the target detection program 136 and the pre-trained models 138 and 140 may be installed by reading the target detection program 136 and the pre-trained models 138 and 140 that are recorded in a recording medium, or the target detection program 136 and the pre-trained models 138 and 140 may be installed by reading the target detection program 136 and the pre-trained models 138 and 140 that are available on a network.

The function of each unit of the computation unit 116 will be described. Each unit of the computation unit 116 can be executed by executing a program stored in the storage unit 118. The target detection processing unit 130 processes the pre-trained models 138 and 140 by using the target detection program 136, and executes a process of determining whether or not a target is included in an acquired image, that is, the target detection process. The notification processing unit 132 uses the notification unit 114 to make a notification about the processing result of the target detection processing unit 130.

Target Detection Method

Figure 2:
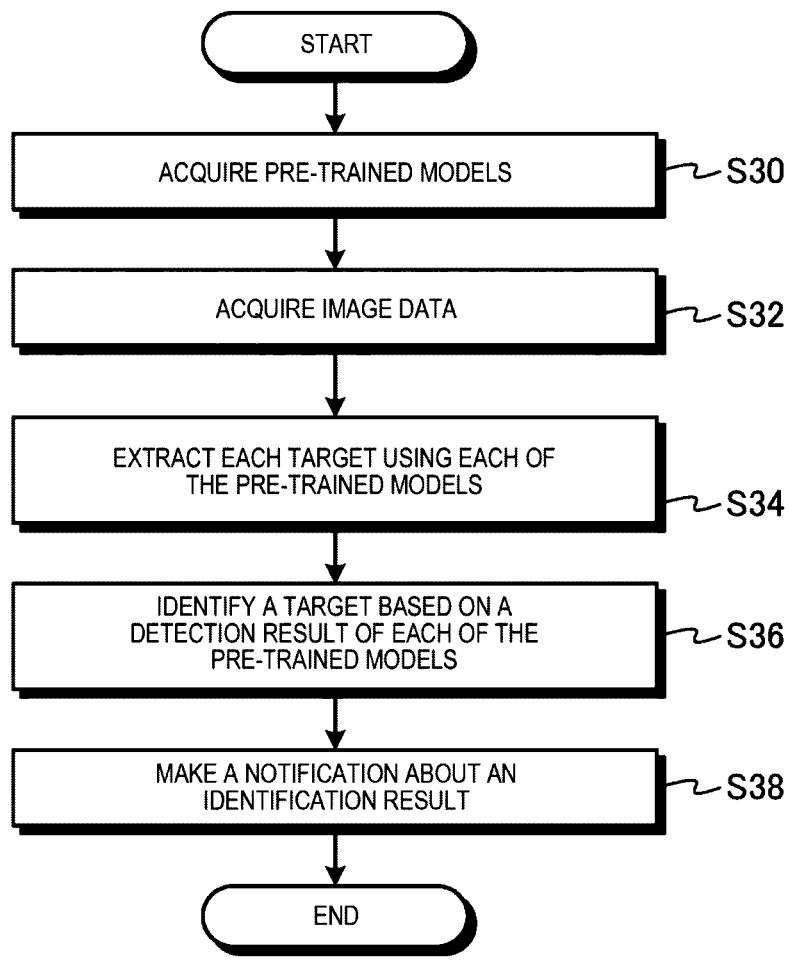
FIG. 2 is a flowchart illustrating an example of processing regarding a target.

Next, a target detection method will be described with reference to FIG. 2. FIG. 2 is a flowchart illustrating an example of an operation of the target detection device. The target detection device 102 executes the process of FIG. 2 by causing the computation unit 116 to process the target detection program 136. The computation unit 116 performs computation using the pre-trained models 138 and 140 during processing of the target detection program 136. The process of FIG. 5 will be described as a process executed by the target detection device 102, but image data may be provided to a program creation device 10 and a similar process may be executed by the target detection processing unit 130.

The target detection device 102 reads the pre-trained models (step S30). The target detection device 102 acquires the pre-trained models created by the program creation device 10. The target detection device 102 acquires image data (step S32). Specifically, the target detection device 102 acquires an image by the camera unit 112.

The target detection device 102 extracts a target based on each of the pre-trained models (step S34). The target detection device 102 processes the acquired image in parallel using the pre-trained models, and executes a target extraction process using each of the pre-trained models.

The target detection device 102 identifies a target based on an extraction result of each of the pre-trained models (step S36). Upon detection of a result that a target has been extracted by any of the pre-trained models, the target detection device 102 determines that the target is present at a detected position. Specifically, the target detection device 102 performs the target detection process on each region set by each of the pre-trained models. By performing the target detection process on each region set by each of the pre-trained models, the target detection process is performed on all regions of a screen. A region on which one of the pre-trained models performs the target detection process may partially overlap with a region on which another one of the pre-trained models performs the target detection process. When no target is detected by any of the pre-trained models, the target detection device 102 determines that there is no target. The target detection device 102 causes the notification unit 114 to make a notification about the identification result (step S38).

Figure 3:
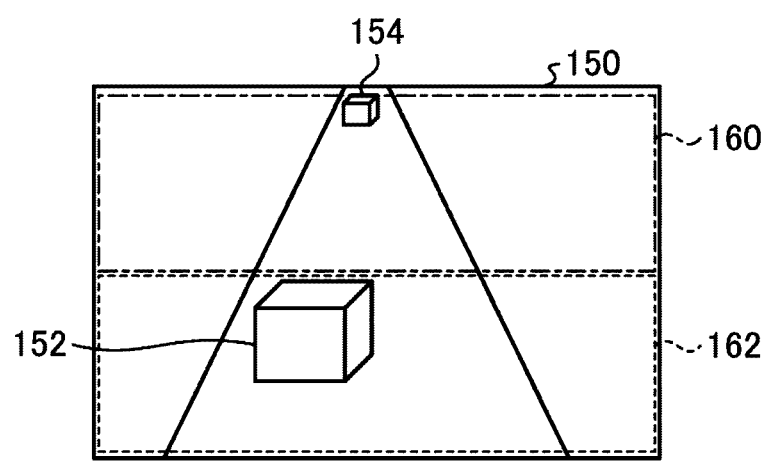
FIG. 3 is an explanatory diagram for describing an example of an image.

FIG. 3 is an explanatory diagram for describing an example of an image. An image 150 illustrated in FIG. 3 includes two targets 152 and 154. The targets 152 and 154 are placed at different positions on the same plane. The target 152 is displayed on a lower side of the target 154. In the image 150, a target located on a far side is displayed on the upper side of the image, and a target located on a near side is displayed on the lower side of the image. Thus, the target 152 is displayed to be larger than the target 154.

In the target detection device 102 according to the present embodiment, the image 150 is divided into upper and lower halves, that is, an upper region 160 and a lower region 162, and the pre-trained models 138 and 140 are specialized for the detection of a target in the respective regions. That is, the pre-trained models 138 and 140 differ from each other in at least one of the size and the position of a target to be detected. For example, the pre-trained model 138 is specialized for the detection in the upper region 160 including a target 154. The pre-trained model 140 is specialized for the detection in the lower region 162 including a target 152. Note that the method of dividing the image is not limited to the above, and the image may be divided into three portions, may be divided into left and right portions, or may be divided at different positions. The target detection device 102 divides an image into regions depending on each position of a target and includes a plurality of pre-trained models each of which is specialized for each region, and thereby processes the image using the plurality of pre-trained models. Here, the plurality of pre-trained models can use various types of deep learning models. For example, a pre-trained model that has learned a different deep learning model is created for each region, and the target detection process is performed on each region. Alternatively, one pre-trained model may be created, and the pre-trained model may be modified to reduce the processing amount depending on a characteristic to be detected so as to obtain a different pre-trained model.

In FIG. 3, different pre-trained models are provided depending on the positions of the targets, but the disclosure is not limited thereto. As one of the plurality of pre-trained models, the target detection device 102 may perform image processing before inputting to a pre-trained model and execute a masking process on the same region determined. Examples of the masking process include a process of excluding a part of an image from a processing target and an extraction process of cutting out a region other than a region needing masking.

Figure 4:
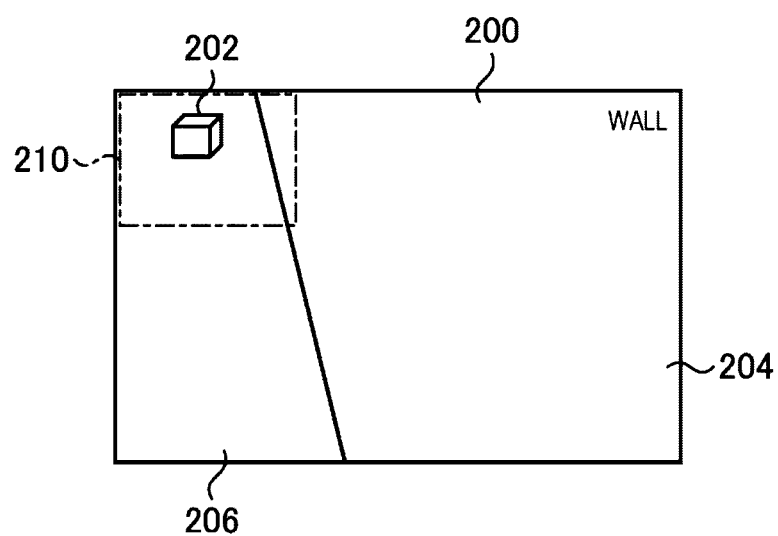
FIG. 4 is an explanatory diagram for describing an example of detection processing.

FIG. 4 is an explanatory diagram for describing an example of an image. The image 200 illustrated in FIG. 4 includes a target 202. A wall constitutes a large part of the image 200, and the target 202 is placed on a passage 206. In this case, in performing processing of a corresponding pre-trained model, the target detection device 102 cuts out a region 210, creates image data in which regions other than the region 210 are masked, processes the image using a corresponding pre-trained model, and extracts the target. The pre-trained model can reduce the processing amount as compared to a case in which the image 200 is directly processed. In this way, it is also possible to include the pre-trained model specialized for the extraction of the target in the image in which a wall 204 or the like without including the target 202 constitutes a large part and the target 202 is located in the region 210. The target detection device 102 can extract the target in the region 210 with high accuracy by executing an analysis using the pre-trained model on an image obtained by extracting only the region 210.

As one of the plurality of pre-trained models, the target detection device 102 may use a program including a process of setting an image region using a result of a sensor mounted at the target detection device 102.

Figure 5:
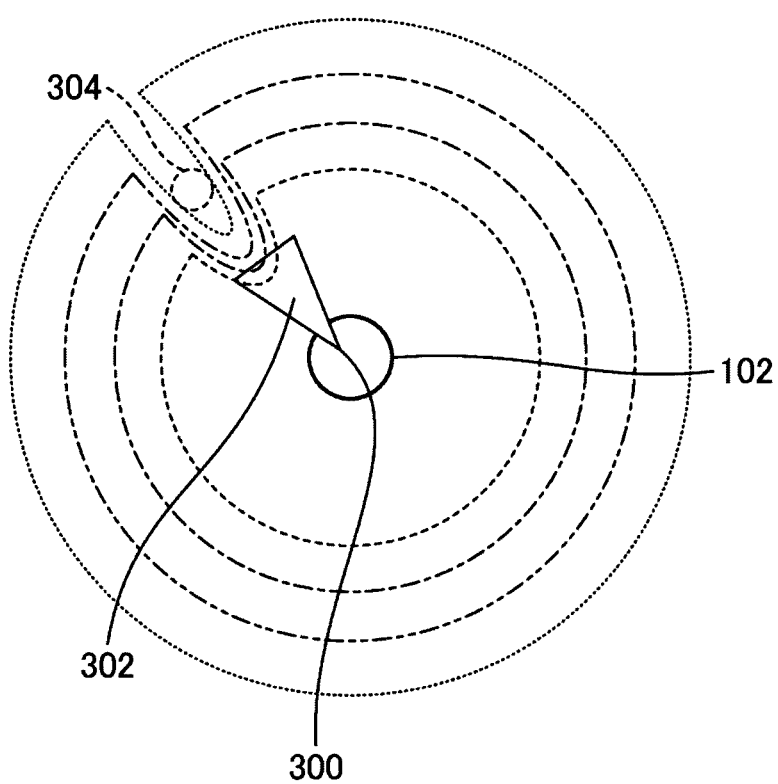
FIG. 5 is an explanatory diagram for describing an example of detection processing.
Figure 6:
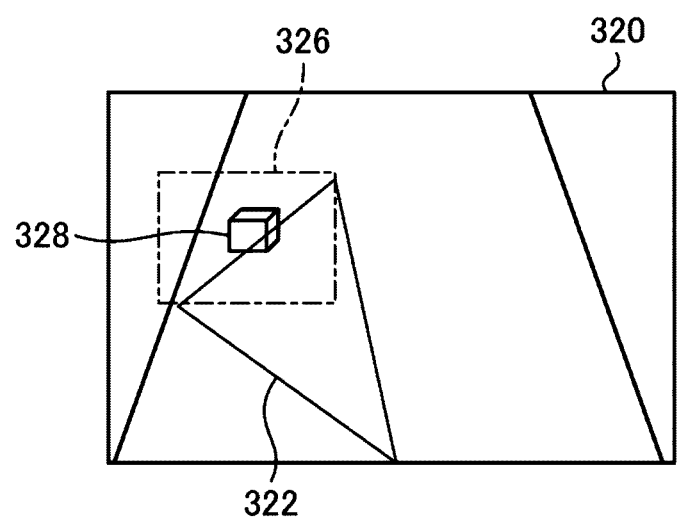
FIG. 6 is an explanatory diagram for describing an example of an image of detection processing.

FIG. 5 is an explanatory diagram for describing an example of detection processing. FIG. 6 is an explanatory diagram for describing an example of an image of detection processing. FIG. 5 is an explanatory diagram for describing an example of an image. FIG. 6 is an explanatory diagram for describing a detection result of a sensor. As illustrated in FIG. 5, the target detection device 102 causes the sensor 113 to detect a target from a starting point 300. The target detection device 102 causes the sensor 113 to emit a detection signal 302 from the starting point 300 so as to detect the direction and the distance of a target 304. In this case, the target detection device 102 acquires an image 320 by the camera as illustrated in FIG. 6. The image 320 includes a target 328. The target 328 is arranged in a region irradiated with a detection signal 322. The target detection device 102 includes, as one of the pre-trained models, a program for detecting a target using the detection result of the sensor 113 and the image as inputs. The target detection device 102 can detect that the image of the target 328 is displayed in a region 326 based on the information detected by the sensor 113.

The target detection device 102 can detect the target by identifying the region 326 based on the information of the sensor 113, extracting the image of only the region 326, and performing the image processing on only the region 326. In this case, the target detection device 102 may perform the processing using only a model corresponding to the region 326 among the plurality of pre-trained models, or may perform analysis by inputting an image in which regions other than the region 326 are masked to the plurality of pre-trained models.

As described above, the target detection device 102 includes the plurality of pre-trained models 138 and 140 that suit the characteristics of the respective targets in the image, and performs parallel processing by the pre-trained models 138 and 140 using the image as an input. Accordingly, the accuracy of target detection can be increased while the processing amount is reduced. Specifically, since each of the plurality of pre-trained models is specialized for the detection of a different characteristic, it is possible to detect a target having a target characteristic with a small processing amount. Similarly, as described above, the pre-trained model using a partially-masked image and the pre-trained model using a sensing result of the sensor can reduce the load of each of the pre-trained models.

As described above, the pre-trained models specialized for respective characteristics can output highly accurate results with a smaller processing amount than the pre-trained model that analyzes the entire image. Accordingly, by selectively using a plurality of models (compressed models with a small computation amount) for each region of an image, a result equivalent to a result of an uncompressed model can be obtained while the overall processing load is reduced as compared with the uncompressed model. As a result, the target detection device 102 can maintain a detection accuracy while reducing the overall processing amount even when the target detection device 102 performs parallel processing using the plurality of pre-trained models.

Figure 7:
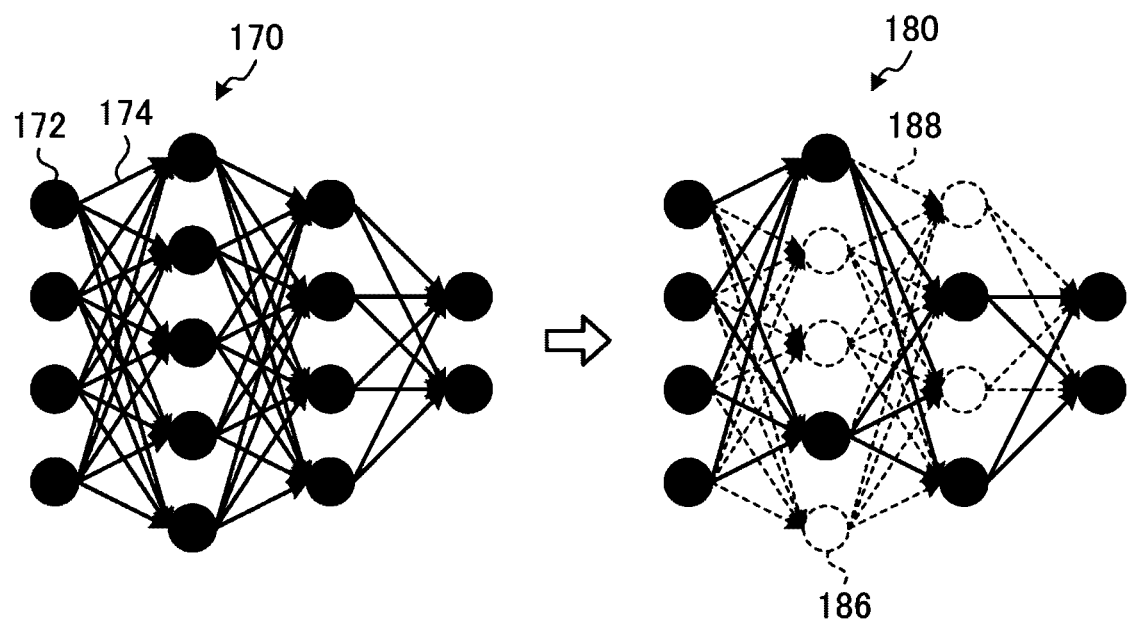
FIG. 7 is an explanatory diagram illustrating an example of a pre-trained model.

FIG. 7 is an explanatory diagram illustrating an example of processing of a pre-trained model. Specifically, the target detection device 102 may use a model obtained by pruning a deep learning network model, that is, a model in which some of options have been eliminated. A learning model 170 includes multi-layer nodes 172 and weights 174 each of which connects the node 172 and the node 172. A learning unit 34 executes learning processing using the learning model 170 to calculate a coefficient of each weight 174 between the nodes 172 of respective layers. Based on the calculated values, the learning unit 34 eliminates the nodes 172 and the weights 174 that satisfy a criterion for determining that the influence on the analysis is small (the degree of influence is small). Then, a model 180 in which the nodes 172 and the weights 174 are reduced as compared with the learning model 170 is created. The model 180 is a model with nodes 186 and weights 188 deleted. By specializing a target to be detected by one pre-trained model for a selected characteristic, the target detection device 102 can perform detection with high accuracy using the model 180 that has undergone pruning, that is, a model in which options having a small degree of influence have been eliminated.

Figure 8:
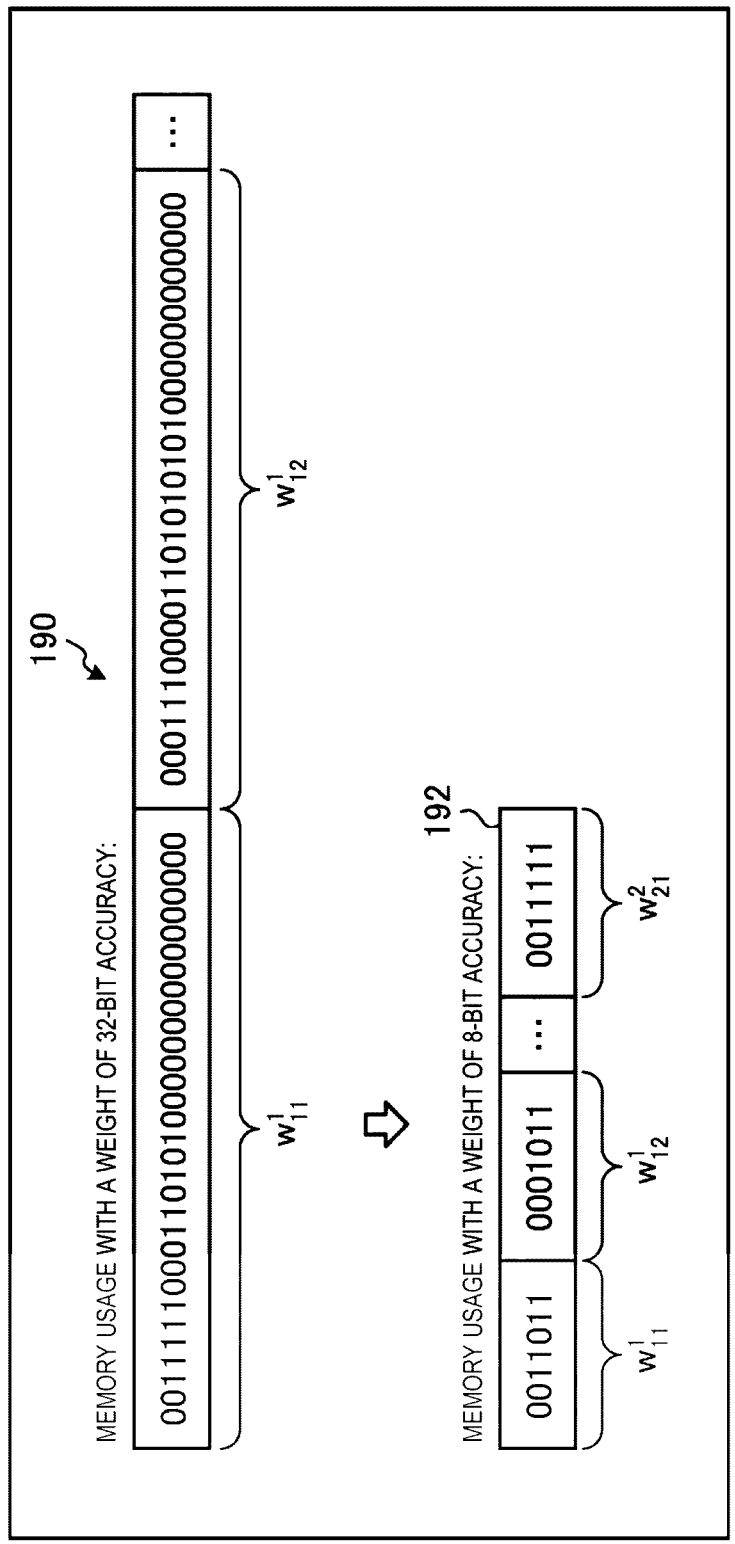
FIG. 8 is an explanatory diagram illustrating an example of a pre-trained model.

Further, the program creation device 10 may set the number of bits of the weight of the deep learning network model to 8 bits or less. FIG. 8 is an explanatory diagram illustrating an example of processing of a pre-trained model. For example, memory data 190 of FIG. 8 illustrates a case in which the weight is 32 bits. On the other hand, memory data 192 illustrates a case in which the weight is 8 bits. The data amount of the memory data 192 is about ¼ of that of the memory data 190. By providing a model having a high target detection accuracy for each region of an image, the target detection device 102 can detect a target with high accuracy even when the resolution of data to be processed is reduced.

Figure 9:
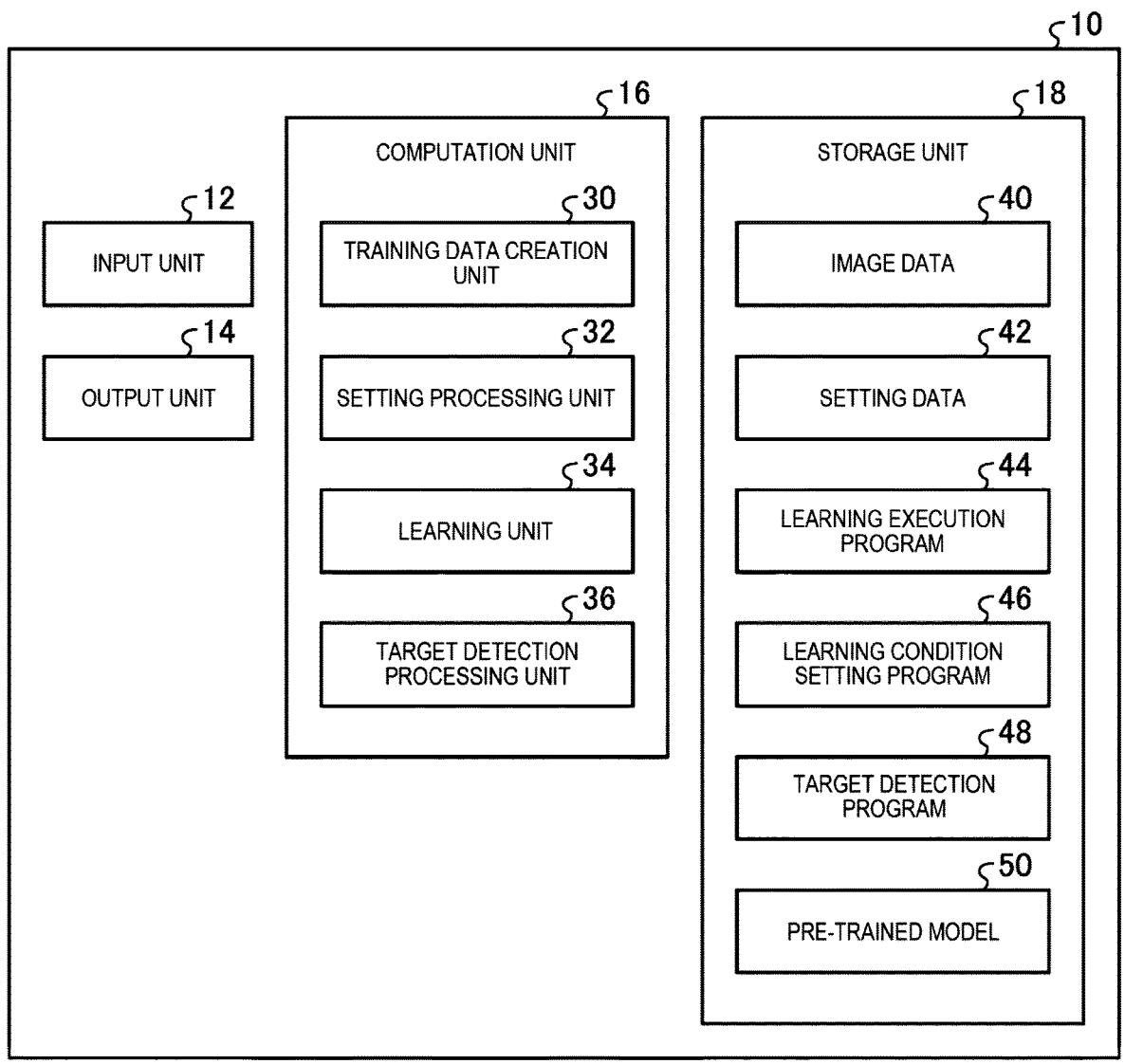
FIG. 9 is a block diagram illustrating an example of a target detection device.

Next, creation of a pre-trained model used by the target detection device 102 will be described. FIG. 9 is a block diagram illustrating an example of a program creation device. The program creation device 10 includes an input unit 12, an output unit 14, a computation unit 16, and a storage unit 18. The input unit 12 includes an input device such as a keyboard and a mouse, a touch panel, or a microphone that collects speech from an operator, and outputs a signal corresponding to an operation performed by the operator on the input device to the computation unit 16. The output unit 14 includes a display device such as a display, and displays a screen including various kinds of information such as a processing result and an image to be processed, in response to a display signal output from the computation unit 16. The output unit 14 may include a recording device that outputs data on a recording medium. The program creation device 10 may include a communication unit that transmits data using a communication interface as the input unit 12 and the output unit 14. The communication unit transmits various types of data and programs acquired by communicating with an external device to the storage unit 18 and stores the data and programs. The communication unit may be connected to an external device via a wired communication line or a wireless communication line.

The computation unit 16 includes an integrated circuit (processor) such as a central processing unit (CPU) or a graphics processing unit (GPU), and a memory serving as a work area, and executes various types of processing by executing various types of programs using these hardware resources. Specifically, the computation unit 16 reads programs stored in the storage unit 18, loads the programs into the memory, and causes the processor to execute instructions included in the programs loaded into the memory, and thereby execute the various types of processing. The computation unit 16 includes a training data creation unit 30, a setting processing unit 32, a learning unit 34, and a target detection processing unit 36. Before describing each unit of the computation unit 16, the storage unit 18 will be described.

The storage unit 18 includes a non-volatile storage device such as a magnetic storage device or a semiconductor storage device, and stores various types of programs and data. The storage unit 18 includes image data 40, setting data 42, a learning execution program 44, a learning condition setting program 46, a target detection program 48, and a pre-trained model 50.

The data stored in the storage unit 18 includes the image data 40 and the setting data 42. The image data 40 includes training data used for learning. The training data is data which associates data of an image and a region (bounding box) where a target is displayed when the target is included in the image. The image of the training data may include data used for learning and data for evaluating the accuracy of the program after learning. In addition, the image data may include image data in which a target needs to be detected. The setting data 42 includes information about conditions for classifying the training data, conditions for processing the training data, and conditions for executing the pre-trained model, and the like.

FIG. 3 is an explanatory diagram for describing an example of an image of the training data. The image 150 illustrated in FIG. 3 includes two targets 152 and 154. The targets 152 and 154 are placed at different positions on the same plane. The target 152 is arranged at a position closer to an image capturing position than the target 154. Thus, the target 152 is displayed to be larger than the target 154. Further, in the image 150, when the targets are placed on the same plane at different distances from the image capturing position, a target located on a far side is displayed on the upper side of the image, and a target located on a near side is displayed on the lower side of the image. Thus, the target 152 is displayed on the lower side of the target 154.

The training data according to the present embodiment is image data in which a region including a target is associated with an image. In addition, the storage unit 18 may add information classified for each characteristic of the target to the image data. The image data can be classified for each position at which the target is located. The program creation device 10 according to the present embodiment creates a pre-trained model specialized for detection of a target with respect to a group of images in which the target is located in the upper region 160 and a pre-trained model specialized for detection of a target with respect to a group of images in which the target is located in the lower region 162. In the present embodiment, the image 150 is divided into upper and lower halves, that is, the upper region 160 and the lower region 162. Note that the method of dividing the image is not limited to the above, and the image may be divided into three portions, may be divided into left and right portions, or may be divided at different positions.

The programs stored in the storage unit 18 include the learning execution program 44, the learning condition setting program 46, the target detection program 48, and the pre-trained model 50. The learning execution program 44 performs deep learning processing on the training data included in the image data 40 based on the setting of the setting data 42, and creates the pre-trained model 50.

The learning condition setting program 46 sets various types of conditions according to which the learning execution program 44 executes image processing using a deep learning model. Specifically, a process of setting image processing conditions and a process of setting change conditions of the deep learning model during the detection processing is executed. The learning condition setting program 46 sets conditions for classifying training models. The learning condition setting program 46 sets conditions for setting detection characteristics of targets and conditions for pruning the deep learning models. The information set by the learning condition setting program 46 is stored in the setting data 42.

The target detection program 48 is a program that executes a target detection process using the plurality of pre-trained models 50. The pre-trained model 50 is a program created by executing the learning execution program 44. Although only one pre-trained model is shown in FIG. 9, a plurality of different pre-trained models are stored. The target detection program 48 can calculate a feature (score) serving as a learned determination criterion by causing the computation unit performing image processing to execute the pre-trained model 50, and executes the target detection process based on the feature.

In the storage unit 18, the learning execution program 44, the learning condition setting program 46, and the target detection program 48 may be installed by reading the learning execution program 44, the learning condition setting program 46, and the target detection program 48 that are recorded in the recording medium, or alternatively, the learning execution program 44, the learning condition setting program 46, and the target detection program 48 may be installed by reading the learning execution program 44, the learning condition setting program 46, and the target detection program 48 that are available on a network.

The function of each unit of the computation unit 16 will be described. Each unit of the computation unit 16 can be executed by executing a program stored in the storage unit 18. When there is a target in the image data, the training data creation unit 30 associates frame information (bounding box) indicating a region of the target with the image data. The frame to be set is rectangular. The training data creation unit 30 sets frame information based on an operation input to the input unit 12 in a state where, for example, an image is displayed on the output unit 14. The operation input to the input unit 12 is an operation in which an operator inputs information of a position surrounding the position of the frame (target) while viewing the image. Further, the training data creation unit 30 may acquire the result of the image extraction processing executed by the target detection processing unit 36. In this case, an operation performed by the operator to determine whether the position of the extracted frame is correct data of the training data may be detected, and data in which the position of the frame is determined to be correct by the operator may be acquired as the training data.

The setting processing unit 32 executes the processing of the learning condition setting program 46 and sets conditions for the processing of the deep learning model executed by the learning unit 34. The setting processing unit 32 sets training data to be processed. The setting processing unit 32 sets conditions for processing the image data of the training data.

The learning unit 34 executes the processing of the learning execution program 44 using the conditions set by the setting processing unit 32 and performs deep learning using the image data 40 as training data, and thereby creates a pre-trained model. The processing of the learning unit 34 will be described later.

The target detection processing unit 36 processes the pre-trained model 50 by using the target detection program 48, and executes processing of determining whether or not a target is included in the acquired image, that is, the target detection process.

In the present embodiment, although the program creation device 10 includes the training data creation unit 30 and the target detection processing unit 36. However, the program creation device 10 need not include the training data creation unit 30 and the target detection processing unit 36. That is, the training data may be created by another device. In that case, a device that implements the function of the training data creation unit 30 serves as a training data creation device. The target detection processing unit 36 that executes the processing of detecting a target from an image may be provided only in the target detection device 102.

Pre-Trained Model Creation Method

Figure 10:
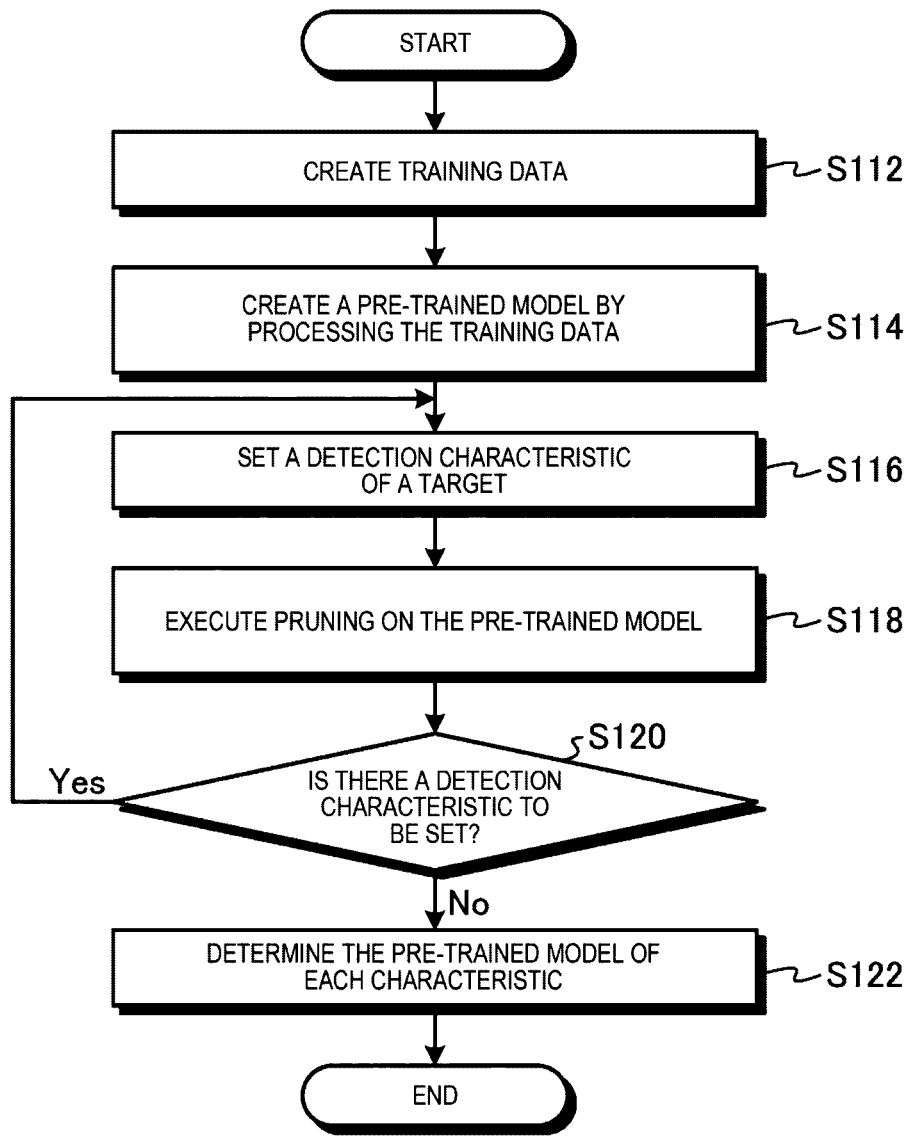
FIG. 10 is a flowchart illustrating an example of a method for creating a pre-trained model.

FIG. 10 is a flowchart illustrating an example of a method for creating a pre-trained model. The processing illustrated in FIG. 10 is executed by the training data creation unit 30 and the learning unit 34 performing computation processing on the learning execution program. In addition, FIG. 10 illustrates a case in which pruning processing is performed. The pruning processing may be operated by an operator.

The training data creation unit 30 creates training data (step S112). For example, training data including image data in which a target is present in the upper region 160 and image data in which a target is present in the lower region 162 is created. The training data includes a plurality of units of image data in which the image data and the information about the position of the target are associated with each other.

The learning unit 34 creates a pre-trained model by processing the training data (step S114). The learning unit 34 creates the pre-trained model by performing deep learning on a learning model using the training data.

The learning unit 34 sets a detection characteristic of the target (step S116). For example, the learning unit 34 sets a case in which a target is present in the upper region 160 as the detection characteristic. The learning unit 34 executes pruning on the pre-trained model (step S118). Based on the set detection characteristic of the target and the conditions set by the setting processing unit 32, the learning unit 34 eliminates, from options of the deep learning model, nodes and weights determined to be changed from the pre-trained model created in step S114. The learning unit 34 extracts nodes and weights that do not affect the detection of the target based on the detection characteristic of the target, eliminates the extracted nodes and weights, and creates a model specialized for the detection characteristic.

The learning unit 34 determines whether or not there is a detection characteristic to be set (step S120). When it is determined that there is a detection characteristic to be set (Yes in step S120), the learning unit 34 returns to step S116. Then, for example, a case in which a target is present in the lower region 162 is set as a different detection characteristic, and another model specialized for the case in which the target is present in the lower region 162 is created by performing partial pruning on the model. Note that the detection characteristics are not limited to the case in which the target is present in each of the upper region 160 and the lower region 162, and models corresponding to the various types of characteristics described above can be created. When it is determined that there is no detection characteristic to be set (No in step S120), the learning unit 34 determines the pre-trained model of each characteristic (step S122) and ends the processing.

As described above, the learning unit 34 executes the deep learning processing to create a pre-trained model. Subsequently, the learning unit 34 modifies the model based on the set detection characteristic to create the pre-trained model that uses the model modified so as to correspond to each detection characteristic and reduce the processing amount. As described above, by identifying the detection characteristics and reducing the processing amount of the model depending on each of the detection characteristics, it is possible to reduce the processing amount of the model while maintaining portions of the detection characteristics required for the target. Accordingly, it is possible to execute analysis with high accuracy using the model having a small computation amount. The above embodiment has described a case in which pruning of a model is performed. However, a model in which the resolution of data to be processed is reduced depending on a detection characteristic may be used. For example, when a case of detecting a large target in an image or a case of detecting a target exhibiting contrast is set as a detection characteristic, even with a model in which the resolution (the number of bits) of the image is reduced, the target can be detected with high accuracy.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A target detection device comprising:
a storage unit configured to store a plurality of pre-trained models using a deep learning network model, the learned programs being configured to detect a target from an image;
a camera unit configured to acquire an image; and
a target detection processing unit configured to execute parallel processing on the acquired image using the plurality of pre-trained models and detect a target based on detection results of the pre-trained models, wherein
each of the pre-trained models is different from the rest of the pre-trained models in a size of a target to be extracted,
wherein the target detection processing unit divides the acquired image into multiple regions, and performs the process of detecting the target by means of a different pre-trained models between a first area among the multiple regions and a second area other than the first area among the multiple regions,
the size of the target to be extracted is different between the pre-trained models that performs the processing in the first area and the pre-trained models that performs the processing in the second area.

2. The target detection device according to claim 1, wherein each of the pre-trained models is a program in which an option having a small degree of influence is eliminated and which differs in a deep learning network model from the rest of the pre-trained models.

3. The target detection device according to claim 1, wherein the deep learning network model has a bit width of 8 bits or less.

4. The target detection device according to claim 1, wherein
one of the plurality of pre-trained models detects a target when the target is included on an upper side of a dividing line of an image, and
one of the plurality of pre-trained models detects a target when the target is included on a lower side of the dividing line of an image.

5. The target detection device according to claim 1, wherein the target detection processing unit performs a process of masking a predetermined region before performing processing using one of the plurality of pre-trained models, and detects a target by processing an image in which the predetermined region is masked, using the one of the pre-trained models.

6. The target detection device according to claim 1, wherein, in the target detection processing unit, the processing using one of the plurality of pre-trained models is processing of data in which position information detected by a sensor at a time of capturing the image is associated with the image.

7. A target detection method comprising:
storing a plurality of pre-trained models using a deep learning network model, the learned programs being configured to detect a target from an image;
acquiring an image; and
detecting a target, the detecting including executing parallel processing on the acquired image using the plurality of pre-trained models, and
detecting the target based on detection results of the pre-trained models, wherein
each of the pre-trained models is different from the rest of the pre-trained models in a size of a target to be extracted,
wherein the target detection processing unit divides the acquired image into multiple regions, and performs the process of detecting the target by means of a different pre-trained models between a first area among the multiple regions and a second area other than the first area among the multiple regions,
the size of the target to be extracted is different between the pre-trained models that performs the processing in the first area and the pre-trained models that performs the processing in the second area.

8. A non-transitory computer readable storage medium storing a target detection program configured to cause processing to be executed, the processing comprising:
storing a plurality of pre-trained models using a deep learning network model, the pre-trained models being configured to detect a target from an image;
acquiring an image; and
detecting a target, the detecting including
executing parallel processing on the acquired image using the plurality of pre-trained models, and
detecting the target based on detection results of the pre-trained models, wherein
each of the pre-trained models is different from the rest of the pre-trained models in a size of a target to be extracted,
wherein the target detection processing unit divides the acquired image into multiple regions, and performs the process of detecting the target by means of a different pre-trained models between a first area among the multiple regions and a second area other than the first area among the multiple regions,
the size of the target to be extracted is different between the pre-trained models that performs the processing in the first area and the pre-trained models that performs the processing in the second area.

* * * * *